May 2, 1967  C. A. DE GIERS  3,316,763
FLUID LEVEL GAUGE
Filed Sept. 22, 1964  4 Sheets-Sheet 1

INVENTOR.
Clarence A. de Giers
BY John A. Harvey
ATTORNEY

May 2, 1967

C. A. DE GIERS

3,316,763

FLUID LEVEL GAUGE

Filed Sept. 22, 1964

INVENTOR.
Clarence A. de Giers
BY John A. Harvey
ATTORNEY

May 2, 1967

C. A. DE GIERS

3,316,763

FLUID LEVEL GAUGE

Filed Sept. 22, 1964

INVENTOR.
Clarence A. de Giers
BY
John A. Harvey
ATTORNEY

United States Patent Office 3,316,763
Patented May 2, 1967

3,316,763
FLUID LEVEL GAUGE
Clarence A. de Giers, Brookville, N.Y., assignor to The Liquidometer Corporation, Long Island City, N.Y., a corporation of Delaware
Filed Sept. 22, 1964, Ser. No. 398,248
11 Claims. (Cl. 73—317)

This invention relates to a fluid level gauge and, more particularly, to a fluid level float gauge providing improved adjustment means for adapting the gauge to measure fluid levels within containers of varying configuration with increased accuracy and one which enables hermetic sealing of the associated fluid container.

The measurement of a fluid level for ascertaining the quantity of fluid within a container has received longstanding usage in numerous and diverse applications. A fluid level float gauge of this nature is usually constructed and calibrated for use with a container of given size and configuration, but preferably should have provision for calibration adjustments at the time of its installation since fluid containers with which it may be used are subject to manufacturing and installation variances. This is particularly true in those applications where the highest gauge accuracy with a particular container is paramount. Thus, the fluid level float actuated sensing portion of the gauge must usually be capable of sensing a fluid level within a container throughout a complete range from completely full to completely empty, and in addition the gauge preferably should provide adjustments for correlating both the range of indicated fluid levels with the range of the actual or sensed fluid levels and for correlating the extremes of the sensed and indicated levels with the actual completely full or completely empty conditions. Various structures have heretofore been proposed to achieve these adjustment capabilities in fluid level float gauges, but have generally proven unsatisfactory either in failing to attain the desired accuracy or in requiring a mechanical structure of undue complexity.

In many instances, the liquid to be stored is of a corrosive nature, requiring its container to be hermetically sealed to prevent escape of harmful fumes. Similarly, highly volatile liquids are preferably stored under pressure to prevent their transition from a liquid to a gaseous state. The stringent requirements imposed in the storage of such liquids renders fluid quantity instrumentation of the containers, as by a fluid level float gauge, extremely difficult. Instrumentation heretofore proposed for measuring fluid levels within such containers has been so inadequate, either in complexity, delicacy of the measurement and indicating mechanisms, expense, or the requirement of expensive and troublesome sealing surfaces, that such containers not infrequently are operated without any fluid quantity instrumentation at all.

The provision of a fluid level float gauge capable of appropriate adjustments at the time of its installation in a fluid container subject to manufacturing and installation variances is necessarily more difficult when the fluid to be stored in the container imposes the requirement of hermetic sealing. The present invention, however, provides a fluid level float gauge which may be adjusted upon installation to provide an accurate indication of the fluid level within a container, regardless of any manufacturing and installation variances to which the container may be subject, while additionally enabling the use of a completely hermetically sealed and pressurized container.

It is therefore an object of this invention to provide a fluid level float gauge of new and improved construction.

Another object of this invention is to provide a novel fluid level float gauge adaptable for use with fluid containers of varying configurations, and one which is readily adjustable for achieving correlation of the range of indicated fluid levels with the range of actual or sensed fluid levels.

It is another object of this invention to provide a fluid level float gauge adaptable for use with fluid containers of varying configurations and adjustable to correlate the extremes of fluid level indications with the extremes of sensed, or actual, fluid levels within the container.

A further object of this invention is to provide a fluid level float gauge adaptable for use with fluid containers subject to manufacturing and installation variances and one which is adjustable to provide correlation of both the range and the extremes of indicated fluid levels with the range and extremes of actual fluid levels.

It is another object of this invention to provide a new and improved fluid level gauge adaptable for use with fluid containers of the hermetically sealed, or pressurized, construction.

Still a further object of this invention is to provide an improved fluid level float gauge adaptable for installation in fluid containers of the hermetically sealed type and one in which the level indications are provided external to the container and may be transmitted to a point distant therefrom if desired.

These and other objects of this invention will become apparent from the following detailed description and drawings thereof in which:

FIG. 2 is an elevational cross-sectional view showing certain structural details of the fluid level gauge of the invention;

Figure 1:
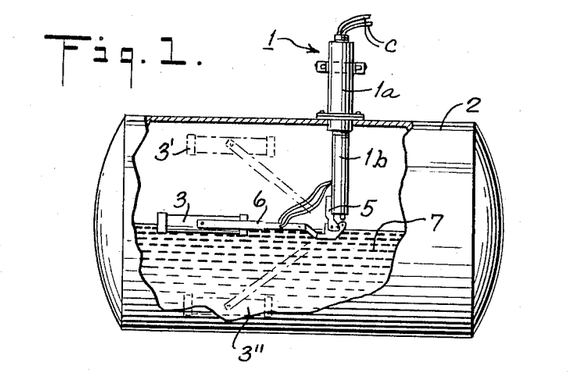
FIG. 1 illustrates the installation of a fluid level gauge embodying the invention in a fluid container and particularly the initial installation at the time of range and limit calibrations.

Referring now more particularly to FIG. 1, a fluid level float gauge 1 embodying the present invention includes an elongated housing 1a and 1b which is partially inserted through an aperture provided in the top center of the wall of a fluid container 2 illustrated by way of example as having cylindrical cross section. The gauge housing 1a, 1b has cylindrical cross section and positions a sensing means, such as a float 3, therewithin. In particular, the lower end 1b of the gauge housing extends within the container 2 and is provided with a support structure to which the float 3 is secured at a pivotal connection 5 by a lever arm 6. As indicated, the lever arm 6 pivots about the pivotal connection 5 to enable the float 3 to move through a range of sensing positions, dependent upon the level of a fluid 7 within the container 2, from a completely full position indicated in dotted lines and identified by the numeral 3', to a completely empty condition, likewise indicated in dotted lines and identified by the numeral 3". A cord C is provided for initial gauge calibration adjustments hereinafter described and is then removed from the gauge structure.

Figures 2, 6:
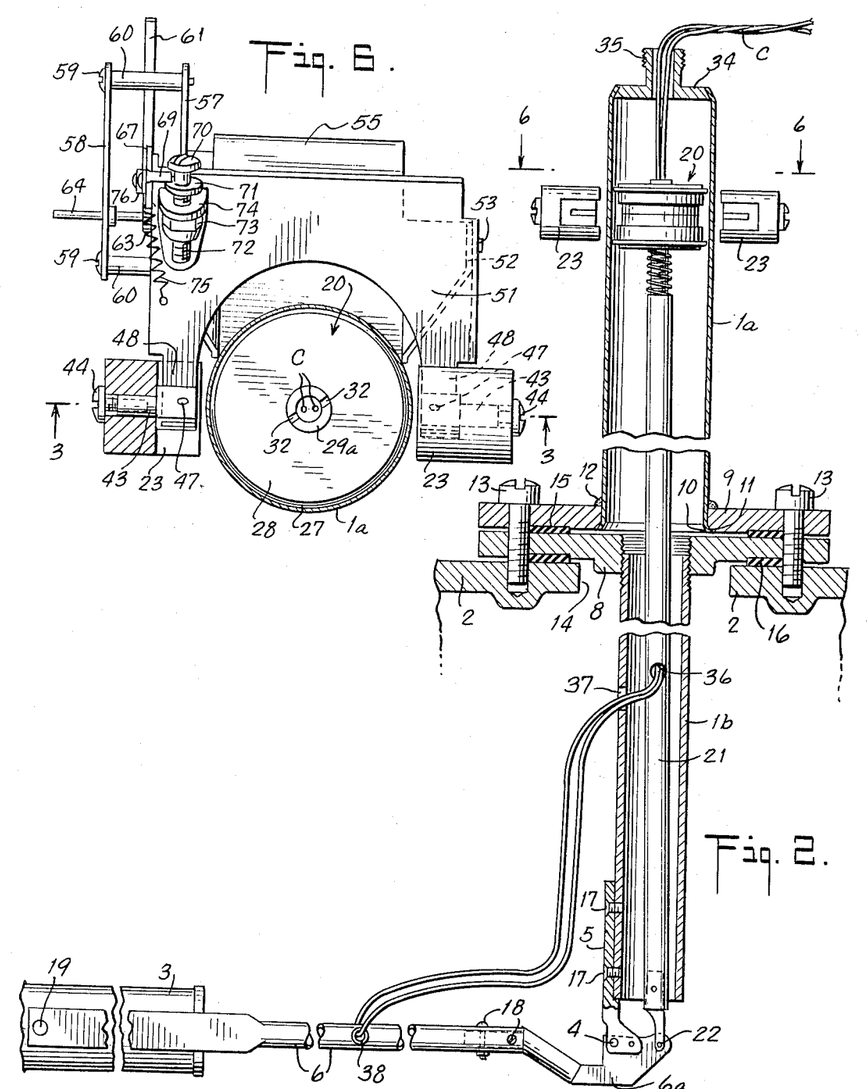

The fluid level gauge 1 of the invention is shown in greater detail in the cross-sectional view of FIG. 2, identical elements being indicated by identical numerals.

The lower housing portion 1b is comprised by cylindrical tubing which is secured to a flange 8 in any suitable manner, such as by a tight threading engagement as shown. The upper housing portion 12a is of non-magnetic cylindrical tubing, such as brass, and is hermetically secured to a flange 9 in any suitable manner as by the provision of alignment bevel surfaces 10 and 11 and brazing 12 as indicated.

The gauge 1 is secured to the container 2 by suitable securing means, such as by a plurality of spaced machine screws 13, with the lower housing portion 1b extending through an aperture 14 provided therefor in the container 2. Suitable sealants, or gaskets, 15 and 16 may be provided intermediate the flanges 8 and 9 and the flange 8 and container 2, respectively, to enable hermetic sealing of the gauge 1 to the container 2.

The pivotal connector 5 has a forked lower end and is secured to the housing portion 1b by suitable securing means, such as the screws 17, for pivotal support of the lever arm 6. The latter is shown to include an end-flattened angular bracket extension arm 6a, suitably secured thereto by screws 18, for pivotal connection at point 4 between the tines of the forked lower end of the connector 5. The lever arm 6 is further secured to the float 3 at a pivotal connection 19 for permitting the float 3 to maintain a horizontal position on the fluid surface at various elevations.

A magnetic actuator 20 is received in sliding engagement with the interior wall surface at the upper housing portion 1a. The actuator 20 is coupled to the bracket arm 6a of the lever arm 6 by a hollow tubular actuator rod 21 at a pivotal connection 22. Thus, upon a change in fluid level, the float 3 will be correspondingly raised or lowered in position and the motion thereof will be transmitted by the lever arm 6 in pivoting about its pivotal connection at point 4 with the connector 5 to effect a proportional motion of the actuator 20 within the housing portion 1a. Further, since the float 3 has a range of motion between its upper and lower level sensing limits, namely, the completely full or completely empty conditions of fluid within the container 2, the actuator 20 likewise has a proportional corresponding range of motion within the housing portion 1a between first and second actuator limits.

Positioned in magnetic flux linkage with the actuator 20, but externally of the housing portion 1a, are a pair of follower permanent magnets 23. The constructions of the actuator 20 and follower magnets 23 are shown in greater detail in the elevational cross-sectional view of FIG. 3.

Figures 3, 4:
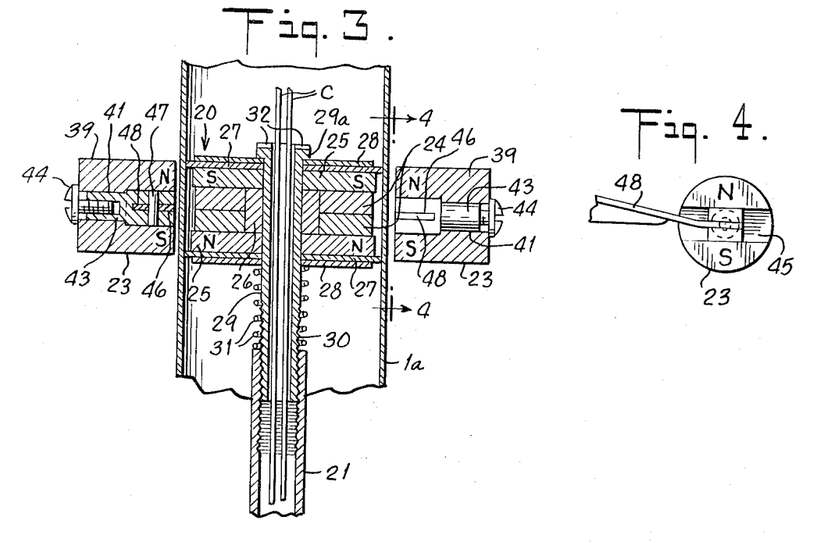
FIG. 3 is an enlarged cross-sectional view showing a fragmentary portion of the fluid level gauge and illustrating more clearly certain structural details thereof.
FIG. 4 is an end view of a follower magnet used in the gauge construction.

In FIG. 3, elements identical to the foregoing described elements are indicated by identical numerals. The actuator 20 is comprised by one or more permanent disc magnets 24, each magnetized to have disc faces of opposite magnetic polarities and stacked with aiding magnetic polarities where plural such discs are used. Positioned on opposite sides of the magnets 24, in symmetrical relationship, are soft iron disc pole pieces 25 spaced by a sleeve spacer 26. An upper end and a lower guide washer 27 movably center the actuator 20 within the housing portion 1a and retaining washers 28 complete the actuator structure.

The actuator 20 is supported upon an adjustment sleeve 29 having an externally threaded end portion 30 which is threadingly received within the internally threaded end portion of the actuator rod 21. A helical wire spring 31 resiliently biases the actuator 20 into frictional engagement with a flanged head portion 29a of the adjustment sleeve 29 to restrain rotation of the actuator on the latter. The adjustment sleeve 29 has a firm threaded engagement with the actuator rod 21, and its flanged head portion 29a includes a screwdriver slot 32 to enable rotation of the adjustment sleeve 29 to adjust the axial position of the actuator 20 within the housing portion 1a relative to a fixed or predetermined position of the actuator rod 21 and thus a fixed or predetermined position of the float 3. Any rotational motion of the actuator 20 at this time is of no consequence since its magnetic field extends in radial directions.

The adjustment sleeve 29 and the actuator rod 21 are hollow so as to permit a cord C to be inserted therethrough. As seen more clearly in FIG. 2, the top end of the housing portion 1a is hermetically closed by a plug 34 brazed to the housing portion 1a and having a concentrically apertured and externally threaded nipple 35 for receiving a cap (not shown) to hermetically seal the gauge housing. The cord C is looped as shown and passes through the aperture of the nipple 35, extends axially through the adjustment sleeve 29 and the actuator rod 21 and emerges from the latter through a side-wall aperture 36, extends through an aperture 37 in the wall of the housing portion 1b, and is threaded through an aperture 38 in the lever arm 6. The cord C permits adjustable positioning of the float 3, by manual manipulations external to the gauge after its installation on a fluid container, over its range of sensing limits during a calibration procedure to be explained hereinafter.

The follower magnets 23 have a construction and are supported in a manner illustrated in FIGS. 3 and 4. The follower magnets 23 comprise a generally cylindrical body portion 39 provided with a coaxial aperture 41 within which is received a cylindrical end portion of a plug-like member 43. As seen more clearly in FIG. 4, taken along the plane 4—4 of FIG. 3, one end of the body portion 39 of the follower magnets 23 includes a transverse slot 45 which provides spaced magnetic pole structures having unlike magnetic polarities to that of the actuator disc magnets 24. Received within each slot 45 is a rectangular cross-section end portion of the plug-like member 43, the rectangular configuration thereof restraining rotation by its close engagement within the slot 45. The cylindrical end portion of the member 43 is coaxially bored and threaded to receive a machine screw 44 by which the follower magnet 23 is maintained in assembled relation on the member 43. The rectangular cross-sectional end portions of the members 43 are also provided with transverse slots 46 to receive, and be affixed by individual pins 47 to, the ends of individual flat support arms 48 formed as forked arms of a pivoted follower plate included in a follower structure next to be considered.

Figure 5:
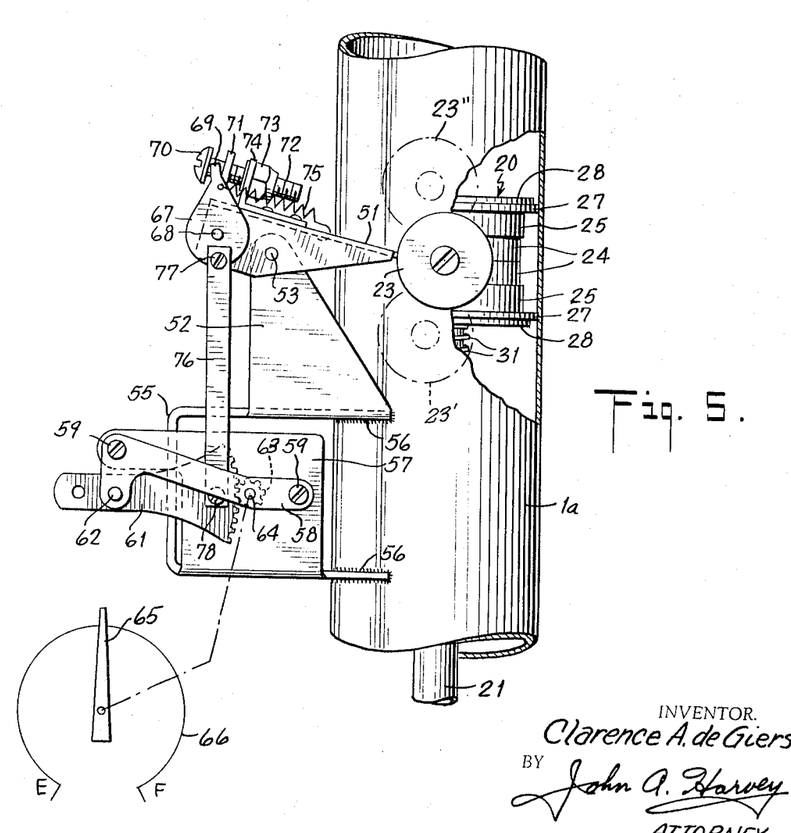
FIG. 5 is an elevational partially cross-sectioned view, and FIG. 6 a plan view, of an actuator-follower drive mechanism of the gauge.

The pivotal support of the follower magnets 23 is shown more clearly in FIGS. 5 and 6, identical numerals being employed to designate elements identical to those of the foregoing figures. The follower magnets support arms 48 are fabricated as fork arms of a plate 51 having down-turned stiffening side flanges pivotally supported on spaced vertical support arms 52 at a pivot point 53. Thus the magnetic flux linkage between the follower magnets 23 and the actuator 20 causes the follower magnets 23 to actuate the follower plate 51 angularly about its pivot point 53 as the follower magnets 23 follow the reciprocal linear motion of the actuator 20. The vertical support arms 52 are formed as integral upstanding arms of a U-shaped bracket member 55, having ends shaped to the external contour of the housing portion 1a and secured thereto as by brazing or welding indicated at 56. The lower leg of the U-shaped bracket member 55 includes a second upturned vertical support plate 57. A bracket 58 is secured to and spaced from the second vertical support plate 57 by screws 59 and tubular spacing members 60.

A sector gear 61 is pivotally supported on the bracket 58 at 62 and engages a pinion gear 63 mounted on a shaft 64 journaled in the plate 57 and bracket 58 which, as just explained, are supported on the housing portion 1a. As schematically indicated, rotation of the pinion gear 63 and its associated shaft 64 by angular drive motion of the sector gear 61 serves to drive an indicator needle 65 cooperating with a gauge scale 66.

An arm 67 is secured as shown to a down-turned flange of the plate 51 by a pivotal connection 68. The arm 67 includes a laterally extending lip 69 which is received between the head 70 and the lip washer of an adjusting screw 72 threadingly received within a nut 73 which is suitably secured to an upturned bracket 74 on the plate 51. A retaining spring 75 resiliently biases the lip 69 of the arm 67 against the fixed washer 71 such that, upon adjustment of adjusting screw 72 into or out of the nut 73, any lost motion is taken up. The adjusting screw 72 thus cooperates with the lip 69 to provide a means for angularly adjusting the arm 67 by incremental rotational amounts to correlate, in a manner presently to be explained, the indication range of the indicator 65, 66 with the follow movement of the follower magnets 23 between the two positional limits of the actuator 20.

A link member 76 pivotally connected at 77 to the arm 67 is pivotally connected at 78 to the sector gear 61 as shown. Thus motion of the actuator 20 is followed by the follower magnets 23, and the resultant angular motion of the follower plate 51 is transmitted through the link member 76 to the sector gear 61 which thereupon rotates the pinion gear 63 and indicator needle 65. By rotating the adjusting screw 72 into or out of the nut 73, it is apparent that the arm 67 will be rotated about its connection point 68 to the plate 51 and effect a lengthening or shortening of the lateral distance between the pivot point 77 and the pivotal connection 53 of the plate 51 to the support arms 52. Thus, depending upon the selected or adjusted position of the arm 67, the proportion by which the sector gear 61 moves in response to a given motion of the follower magnets 23 may be adjusted.

The advantage of this adjustment may be appreciated by considering the dotted line positions 23' and 23" of the follower magnets 23 to indicate the limits of the motion of the latter in response to the motion of the actuator 20 to either of its actuator limits. This motion of the follower magnets 23 will, as hereinbefore explained, effect a rotation of the indicator needle 65 through a range corresponding to the sensing range. However, the range of motion of the actuator 20, and thus the range of motion of the follower magnets 23, will vary in dependence upon the actual range of physical displacement through which the associated level sensing float of the gauge moves. This physical displacement range of the float will vary in turn upon dimensional manufacturing variations of the fluid container, so that the response range through which the indicator needle 65 moves may not necessarily coincide with the indicating range between the positions E and F of the indicator scale 66. Thus, by rotating the arm 67 by the adjusting screw 72, and thereby varying the displacement between pivot points 77 and 53, the proportion by which the sector gear 61 moves in response to a given extent of motion of the follower magnets 23 may be adjusted for correlating the range of motion of the indicator needle 65 with the necessarily fixed indicating range of the indicator scale 66.

The manner in which the fluid level gauge of the invention is initially adjusted after installation on a fluid container, and by which to compensate to manufacturing and installation variances, will now be considered. After the gauge 1 has been installed on the container 2, as indicated in FIG. 1, the container is emptied of all fluid and the cord C is pulled taut to raise the float 3 to the top of the container 2 (indicative of a filled condition) and is then released to allow the float 3 to drop to the bottom of the container 2 corresponding to an empty condition. During this procedure, the operator notes the range through which the indicator needle 65 moves to determine if it is greater or less than the prescribed indicating range of the scale 66 of the gauge and also if the limits of the response range of the indicator needle 65 correspond to the limits indicated by the letters E and F of the indicator scale 66 of the gauge.

Where these conditions are not entirely fulfilled, as may often be the cause, the adjustment procedure involves rotation of the adjusting screw 72 to vary the proportion by which the sector gear 61 moves in response to a given motion of the follower magnets 23. Once the response range has been correlated with the indicating range of the indicator scale 66, the limits or extremes may be correlated by screwdriver rotation of the adjustment sleeve 29, performed simply by inserting a screw driver through the apertue of the nipple 35 at the top of the gauge housing and into engaging relation with the screwdriver slot 32 of the adjustment sleeve 29. Rotating the adjustment sleeve 29 varies the position of the actuator 20 relative to a predetermined position (i.e., the full or empty position) of the float 3, thereby causing a corresponding change in the position of the follower magnets 23. The resultant motion of the follower magnets 23 will vary the position of the sector gear 61 with subsequent rotation of the pinion gear 63 to correlate the limits of the response range of the indicator needle 65 with the selected one of the limits of the indicator scale 66. Since the response range has previously been correlated with the indicating range thereof, correlation of one response limit with one of the indicating limits necessarily will provide correlation of the other response and indicating limits.

In addition to the relative ease with which these adjustments are performed, it should be appreciated that the adjustments have no significant effect upon the accuracy of the indications provided. When it is considered that the follower magnets 23 in moving through their follower range from the extreme positions indicated in dotted lines by the numerals 23' and 23" in FIG. 5 follow an arcuate path of sufficiently large radius as to be essentially linear, it will be evident that the magnetic flux linkage between the follower magnets 23 and the actuator 20 remains essentially constant over the range of their movement. Thus, the adjustment of the vertical positioning of the actuator 20 to coincide with one extreme range position 23' or 23" of the follower magnets in attaining correlation between the indicating limits of the scale 66 effects insignificant variation in the flux linkage over the indicating range with the result that high accuracy of indication is maintained over the full indicating range. Similarly, adjustments of the arm 67 in correlating the response indicating range do not significantly change the displacement of the pivot point 78 from the pivot point 68 and thus do not modify the angular position of the sector gear 61 with respect to the angular position of the follower plate 51. Therefore, the proportionality factor by which the sector gear 61 angularly moves in response to angular motion of the follower magnets 23 is adjusted without affecting any given indicating position of the indicating needle 65 on the gauge scale 66.

Following the initial installation adjustments as hereinbefore set forth, the cord C is removed from the gauge simply by releasing one of the cord strands and pulling the other until the free end of the cord threads down through the actuator rod 21 (FIG. 2), through the aperture 38 of the arm 6, and is pulled upwardly and out of the actuator rod. As previously mentioned, a suitable cap is screwed onto the threaded nipple 35 hermetically to seal the gauge housing portion 1a to the container 2.

Figure 7:
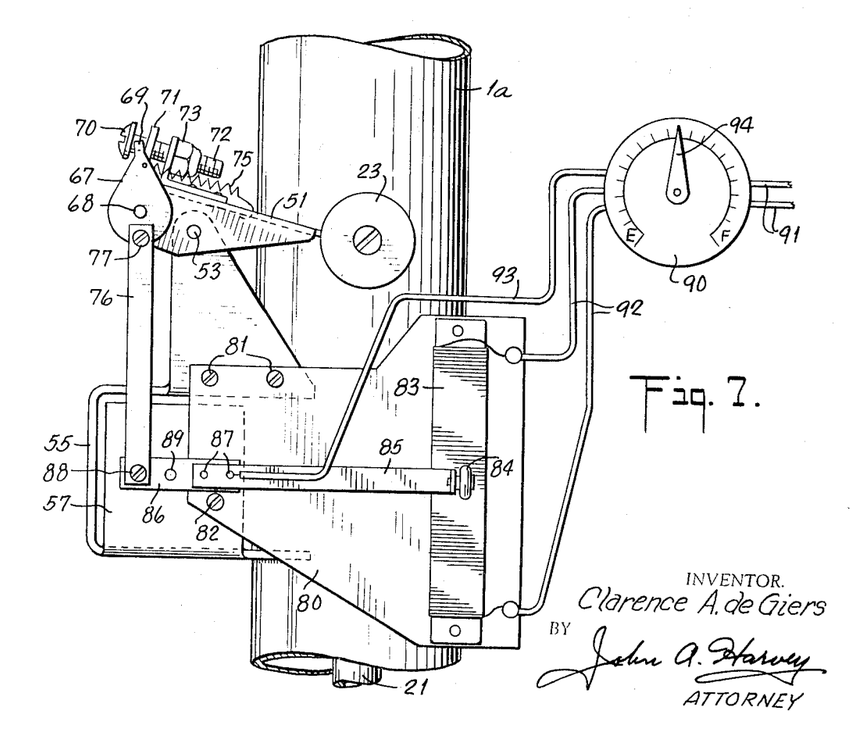
FIG. 7 illustrates a modified form of the invention utilizing an electrical indicator.

A modified form of the invention is shown in FIG. 7 wherein an electrical indicating means is provided in place of the mechanical indicator heretofore described. Again, like gauge elements are indicated by like reference numerals. In place of the sector gear 61 and pinion gear 63 which provide the mechanical indications in the gauge above considered, the modified gauge includes an insulating base 80 secured as shown to one of the vertical support arms 52 by screws 81 and to the vertical support plate 57 by a screw 82. A flat wound slide wire resistance element 83 is secured to the insulating base 80 and positioned to be engaged by an electrical contact roller element 84, pivotally supported on the upturned end of an electrically conductive arm 85 secured to an insulating bar 86 by rivets 87. The insulating bar 86 is pivotally supported at 89 on the vertical support plate 57, and the link member 76 is now pivotally connected at 88 to the insulating bar 86. Angular motion of the follower magnets 23 will now be translated through the link member 76 to the insulating bar 86, causing the latter to rotate about its pivot point 89 and effect movement of the contact element 84 along the slide wire resistance element 83.

An electrical indicator 90 is supplied with electrical power through line conductors 91 and in turn supplies power through conductors 92 to the end terminals of the slide wire resistance element 83. The electrical indicator 90, conveniently of the proportional variety such as a conventional ratiometer, is also electrically connected by a conductor 93 to the conductive arm 85 and the contact element 84. In operation, the motion of follower magnets 23 will effect a proportional movement of the contact element 84 along the length of the resistance element 83, and the voltage between one end of the resistance element 83 and the contact element 84 then provides a measure of the prevailing position of the follower magnets 23. This voltage is supplied through the conductor 93 and one of the conductors 92 to the electrical indicator 90 which, in responding to the voltage, positions an indicating needle 94 to provide the gauge level indications.

Figure 8:
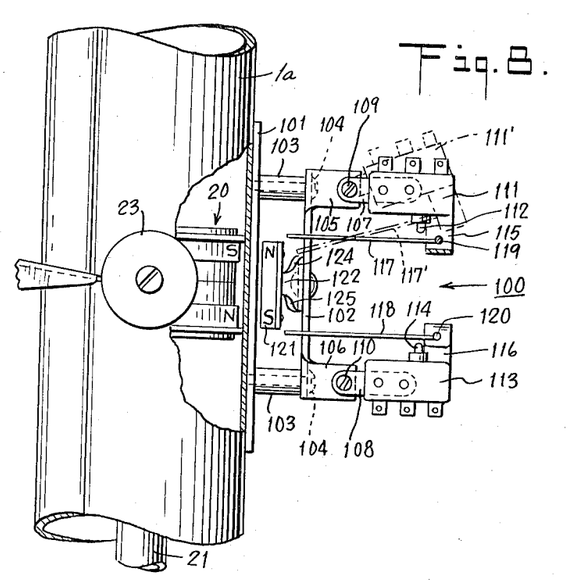
FIGS. 8 and 9 illustrate an embodiment of the invention permitting fluid level limit indication and control.
Figure 9:
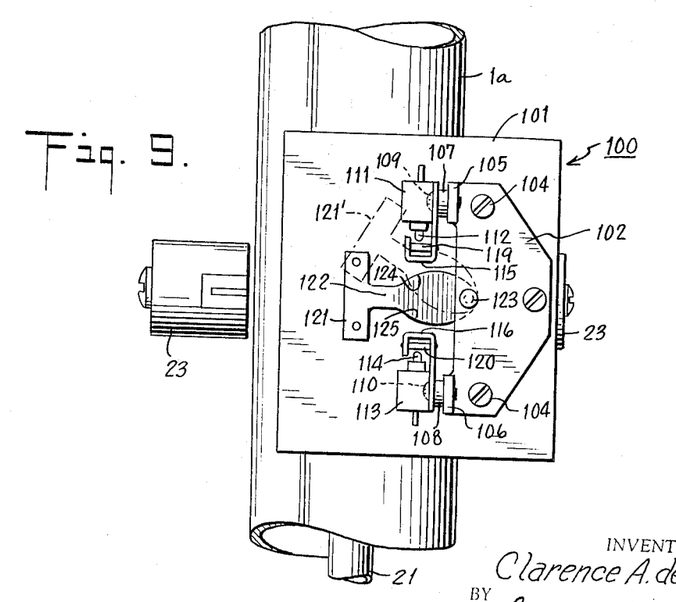

In FIGS. 8 and 9 there is illustrated a further embodiment of the invention providing a limit switch construction which may be utilized in conjunction with, or independently of, the foregoing described gauge constructions. Follower magnets 23 are indicated in FIGS. 8 and 9 to illustrate the adaptation of a limit switch mechanism 100 to one form of the gauge constructions earlier described. The limit switch mechanism 100 includes a mounting plate 101 suitably secured in any convenient manner, as by encircling straps (not shown), to the gauge housing portion 1a and to which a mounting bracket 102 is secured in spaced relation by spacers 103 and screws 104. Mounting bracket 102 includes transverse tab portions 105 and 106 to which pivot plates 107 and 108, respectively, are connected by screws 109 and 110. Switch mechanisms, such as a microswitch 111 having a switch contact actuator 112 and a similar microswitch 113 having a switch contact actuator 114, are respectively secured to the pivot plates 107 and 108.

Attached to the microswitches 111 and 113 are respective bracket members 115 and 116 to which individual lever arms 117 and 118 are pivotally connected at the points 119 and 120. The pivoted lever arms 117 and 118 actuate their associated switch contact actuators 112 and 113.

The actuation of the lever arms 117 and 118 and their associated microswitches 111 and 113 is effected by a permanent magnet follower 121 which is positioned in magnetic flux path linkage with the actuator 20 to perform a follower motion in a manner similar to that of the follower magnets 23. The magnetic polarization of the follower 121 in relation to that of the actuator 20 is indicated by the north and south polarity notations in FIG. 8 to provide aiding flux field linkage for the follower action.

As seen more clearly in FIG. 9, the follower 121 is secured to an actuating arm 122 pivotally supported at 123 on the mounting bracket 102. The actuating arm 122 includes edge surfaces 124 and 125 which upon angular reciprocal motion of the arm 122 engage respective ones of the lever arms 117 and 118 for effecting their deflection to actuate the microswitch actuators 111 and 113.

Thus, as the actuator 20 approaches its upper limit of motion for example, the follower 121 will assume the position indicated in dotted lines 121' and its engaging surface 124 will engage and deflect the lever arm 117 to depress the switch contact actuator 112 and operate the movable contact of the microswitch 111. Each of the microswitches 111 and 113 is conventional, and mechanical actuation of their switch contacts may be used to accomplish any desired switching function. Illustratively, each of the microswitches 111 and 113 may be of the double-pole, double-throw type to effect controlled electrical energization of a pump motor or other level control device or may be of the single-pole normally-open-contact type such as would suffice for providing electrical energization of a visual warning lamp or audible buzzer. It is apparent that the follower 121 may be displaced in the opposite direction to that indicated by dotted lines 121' such that its engaging surface 125 effects actuation of the lever arm 118 to operate the switch contact actuator 114 and operate the microswitch 113.

The microswitches 111 and 113 with their associated bracket members 115 and 116 and pivotally supported actuating lever arms 117 and 118 may be conveniently angularly adjusted, by rotation about their mounting screws 109 and 110, to correlate their switch contact actuations in relation to the limits of movement of the actuator 20. Thus by rotating the pivot plate 107 and microswitch 111 to the position indicated by dotted lines 111' and tightening the screw 109 to retain the microswitch 111 in this new position, the associated lever arm 117 will assume a corresponding new position (indicated by dotted lines 117') where it is engaged and operated by the actuating arm 122 at an angular position of the latter corresponding to less than the upper limit of movement of the actuator 20.

A fluid level gauge embodying the present invention is one providing highly accurate level indications, particularly in that it readily enables simply effected adjustments upon initial installation to calibrate the gauge indication range and range limits for container manufacturing and installation variances. The fluid level gauge of the invention is of rugged construction and relatively low manufacturing cost, and is suitable for use in hermetically sealed and even pressurized fluid container installations. The gauge indications may be provided by a purely mechanical structure or may be transmitted electrically to a remote point, and in either event (or alternatively) electrical limit switches enable level-limit electrical control or limit warnings.

Many modifications and adaptations of the fluid level gauge of the invention and its various appurtenances will be readily apparent to those skilled in the art. Thus, it is intended by the appended claims to cover all such modifications and adaptations which fall within the true spirit and scope of the invention.

What I claim is new and desire to secure by Letters Patent of the United States is:

What is claimed is:

1. A fluid level gauge for measuring the level of fluid within a container comprising movable sensing means and non-magnetic housing means adapted to support said sensing means within a container for movement between two sensing limits to sense the level of fluid in the container, actuator means of magnetically permeable material and guided for linearly reciprocable movement within said housing means, adjustable coupling means coupling said actuator means to said sensing means for movement between two actuator limits in proportion to the movement of said sensing means between said two sensing limits, said adjustable coupling means being accessible from the exterior of said housing means and operable to vary the position of said actuator means relative to a selected position of said sensing means, follower means of magnetically permeable material, at least one of said actuator and follower means providing a magnetic field, means for supporting said follower means on the exterior of said housing means and in magnetic flux path linkage with said actuator means to follow the motion thereof, temporary calibration means accessible from the exterior of said housing means for selectively positioning said sensing means in each of said two sensing limits for effecting initial calibration adjustments of said adjustable coupling means, and indicator means coupled to said follower means to provide an indication of the fluid level within said container.

2. A fluid level gauge for measuring the level of fluid within a container comprising movable sensing means and non-magnetic housing means adapted to support said sensing means within a container for movement between two sensing limits to sense the level of fluid in the container, linearly reciprocable actuator means of magnetically permeable material coupled to said sensing means and supported within said housing means for movement between two actuator limits in proportion to the movement of said sensing means between said two sensing limits, follower means of magnetically permeable material, at least one of said actuator and follower means providing a magnetic field, pivotal support means for supporting said follower means on the exterior of said housing means and in magnetic flux path linkage with said actuator means to follow the motion thereof through a response range, adjustable means mounted for adjustable rotation on said pivotal support means about an axis parallel with the pivotal axis of said pivotal support means, indicator means defining an indicator range of fluid levels within said container and including an indicator element fixedly mounted on a rotatable shaft, driven gear means fixedly mounted on said rotatable shaft and driver gear means mounted for arcuate motion and engaging said driven gear means, and means interconnecting said adjustable means with said driver gear means, said adjustable means being adjustably rotatable for varying the proportion by which said driven gear means moves relative to the movement of said follower means to correlate said response range with said indicator range.

3. A fluid level gauge for measuring the level of fluid within a container comprising movable sensing means and non-magnetic housing means adapted to extend through and hermetically close an aperture in a container to support said sensing means within the container for movement between two sensing limits corresponding to two levels of fluid in the container, linearly reciprocable actuator means of magnetically permeable material enclosed within said housing means in continuous hermetic communication with the interior of said container, adjustable coupling means coupling said actuating means to said sensing means for movement between two actuator limits in proportion to the movement of said sensing means between said two sensing limits, said adjustable coupling means being accessible from the exterior of said housing means through an hermetically sealable aperture thereof for adjusting the position of said actuator means relative to a predetermined position of said sensing means, follower means of magnetically permeable material, at least one of said actuator and follower means providing a magnetic field, means for supporting said follower means on the exterior of said container in hermetic isolation therefrom and in magnetic flux path linkage with said actuator means to follow the motion thereof, and indicator means coupled to said follower means to provide an indication of the fluid level within said container.

4. A fluid level gauge for measuring the level of fluid in a container comprising movable sensing means and non-magnetic housing means adapted to extend through and hermetically close an aperture in a container to support said sensing means within the container for movement between two sensing limits corresponding to two levels of fluid in the container, linearly reciprocable actuator means of magnetically permeable material enclosed within said housing means in continuous hermetic communication with the interior of said container, adjustable coupling means coupling said actuating means to said sensing means for movement between two actuator limits in proportion to the movement of said sensing means between said two sensing limits, said adjustable coupling means being accessible from the exterior of said container through an hermetically sealable aperture for adjusting the position of said actuator means relative to a predetermined position of said sensing means, temporary calibration means coupled to said sensing means and extending through said hermetically sealable aperture to the exterior of said container for selectively positioning said sensing means in said two sensing limits thereof to effect initial calibration adjustments of said adjustable coupling means, follower means of magnetically permeable material, at least one of said actuator and follower means providing a magnetic field, means for supporting said follower means on the exterior of said container in hermetic isolation therefrom and in magnetic flux path linkage with said actuator means to follow the motion thereof, and indicator means coupled to said follower means to provide an indication of the level of fluid within said container.

5. A fluid level gauge for measuring the level of fluid within a container comprising movable sensing means and support means adapted to extend through and close an aperture in a container to support said sensing means within said container for movement between two sensing limits corresponding to two levels of fluid in the container, said support means including a housing portion extending exteriorly of said container, linearly reciprocable actuator means of magnetically permeable material received within and reciprocally supported by said housing portion, an actuator rod connecting said sensing means and said actuator means and including adjustable means accessible through an aperture in said housing portion for supporting said actuator means at an adjustably selectable position on said actuator rod relative to a predetermined position of said sensing means, said actuator rod moving said actuator means between two actuator limits in proportion to the movement of said sensing means between said two sensing limits, flexible actuating means removably connected to said sensing means and extending through said aperture in said housing portion to the exterior of said container for selectively actuating said sensing means between said two sensing limits thereof to effect initial calibration adjustments of said adjustable means, sealing means for hermetically sealing said aperture in said housing portion upon removal of said flexible actuating means, follower means of magnetically permeable material, at least one of said actuator and follower means providing a magnetic field, pivotal support means for supporting said follower means on the exterior of said housing means and in magnetic flux path linkage with said actuator means to follow the motion thereof, indicator means defining an indicating range of fluid levels within said container and including an indicator element movable through a response range in proportion to the movement of said follower means, and adjustable interconnecting means for connecting said indicator element to said pivotal support means, said adjustable interconnecting means being operable to adjust the proportion by which said indicator element moves relative to movement of said follower means to correlate said response range with said indicating range.

6. A fluid level gauge for measuring the level of fluid within a container comprising: movable sensing means and non-magnetic housing means adapted to support said sensing means within a container for movement between two sensing limits to sense the level of fluid in the container, linearly reciprocable actuator means of magnetically permeable material coupled to said sensing means and guided within said housing means for movement between two actuator limits in proportion to the movement of said sensing means between said two sensing limits, follower means of magnetically permeable material, at least one of said actuator and follower means providing a magnetic field, support means for pivotally supporting said follower means on the exterior of said housing means and in magnetic flux path linkage with said actuator means to move in an arcuate path and follow the motion of said actuator means between said two actuator limits, an arm pivotally supported on said support means for rotation about an axis parallel to and spaced from the pivotal axis of said support means, indicator means including an indicator driven by a shaft rotationally journaled on said housing means and carrying a pinion gear drivingly engaged by a segmental gear rotationally supported by said housing means, a link member mechanically connecting said segmental gear and said arm for angular drive of said segmental gear and indicator by angular movement of said support means and thereby provide indications by said indicator means of the prevailing height of fluid within said container, and means for angularly adjusting said arm by incremental rotational amounts to correlate the indication range of said indicator means with the follow movement of said follower means between said two actuator limits.

7. A fluid level gauge for measuring the level of fluid within a container comprising: movable sensing means and non-magnetic housing means adapted to support said sensing means within a container for movement between two sensing position limits to sense the level of fluid in the container, linearly reciprocable actuator means of magnetically permeable material coupled to said sensing means and guided within said housing means for movement between two actuator position limits in proportion to the movement of said sensing means between said two sensing position limits, follower means of magnetically permeable material, at least one of said actuator and follower means providing a magnetic field, support means for pivotally supporting said follower means on the exterior of said housing means and in magnetic flux path linkage with said actuator means to move in an arcuate path and follow the motion of said actuator means between said two actuator position limits, an arm pivotally supported on said support means for rotation about an axis parallel to and spaced from the pivotal axis of said support means, indicator means including a fixed scale and a scale indicator driven by a shaft rotationally journaled on said housing means and carrying a pinion gear drivingly engaged by a segmental gear rotationally supported by said housing means, a link member mechanically connecting said segmental gear and said arm for angular drive of said segmental gear and indicator by angular movement of said support means and thereby provide indications by said indicating means of the prevailing height of fluid within said container, and means for adjusting one position limit of said actuator means in relation to a corresponding position limit of said sensing means to effect coincidence between the indicating range of said indicator means and the fixed scale thereof.

8. A fluid level gauge for measuring the level of fluid within a container comprising: movable sensing means and non-magnetic housing means adapted to support said sensing means within a container for movement between two sensing limits to sense the level of fluid in the container, linearly reciprocable actuator means of magnetically permeable material enclosed within said housing means, adjustable coupling means coupling said actuator means to said sensing means for movement between two actuator limits in proportion to the movement of said sensing means between said two sensing limits, said adjustable coupling means being accessible from the exterior of said housing means through a sealable aperture thereof for adjusting the position of said actuator means relative to a predetermined position of said sensing means, follower means of magnetically permeable material, at least one of said actuator and follower means providing magnetic field, support means for pivotally supporting said follower means on the exterior of said housing means and in magnetic flux path linkage with said actuator means to move in an arcuate path and follow the motion of said actuator means between said two actuator limits, an arm pivotally supported on said support means for rotation about an axis parallel to and spaced from the pivotal axis of said support means, indicator means including an indicator driven by a shaft rotationally journaled on said housing means and carrying a pinion gear drivingly engaged by a segmental gear rotationally journaled by said housing means, a link member mechanically connecting said segmental gear and said arm for angular drive of said segmental gear and indicator by angular movement of said support means and thereby provide indications by said indicator means of the prevailing height of fluid within said container, said adjustable coupling means being adjustable to correlate one limit indication of said indicator means with a corresponding one of said two actuator limits, and means for angularly adjusting said arm by incremental rotational amounts to correlate the indication range of said indicator means with the movement of said follower means between said two actuator limits.

9. A fluid level gauge for measuring the level of fluid within a container comprising: movable sensing means and non-magnetic housing means adapted to support said sensing means within a container for movement between two sensing limits to sense the level of fluid in the container, linearly reciprocable actuator means of magnetically permeable material enclosed within said housing means, adjustable coupling means coupling said actuator means to said sensing means for movement between two actuator limits in proportion to the movement of said sensing means between said two sensing limits, said adjustable coupling means being accessible from the exterior of said housing means through a sealable aperture thereof for adjusting the position of said actuator means relative to a predetermined position of said sensing means, follower means of magnetically permeable material, at least one of said actuator and follower means providing a magnetic field, support means for pivotally supporting said follower means on the exterior of said housing means and in magnetic flux path linkage with said actuator means to move in an arcuate path and follow the motion of said actuator means between said two actuator limits, temporary calibration means accessible from the exterior of said housing means through said sealable aperture thereof for selectively positioning said sensing means in each of said two sensing limits to effect initial calibration adjustments of said adjustable coupling means, an arm pivotally supported on said support means for rotation about an axis parallel to and spaced from the pivotal axis of said support means, indicator means including a fixed scale and a scale indicator driven by a shaft rotationally journaled on said housing means and carrying a pinion gear drivingly engaged by a segmental gear rotationally journaled by said housing means, a link member mechanically connecting said segmental gear and said arm for angular drive of said segmental gear and indicator by angular movement of said support means and thereby provide indications by said indicator means of the prevailing height of fluid within said container, adjustments of said adjustable coupling means being effective through said follower means to correlate one limiting scale indication of said indicator means with a corresponding one of said two actuator limits, and means for angularly adjusting said arm by incremental rotational amounts to correlate the indication range of the scale of said indicator means with the follow movement of said follower means between said two actuator limits.

10. A fluid level gauge for measuring the level of fluid within a container comprising: movable sensing means and non-magnetic housing means adapted to support said sensing means within a container for movement between two sensing limits to sense the level of fluid in the container, linearly reciprocable actuator means of magnetically permeable material coupled to said sensing means and guided within said housing means for movement between two actuator limits in proportion to the movement of said sensing means between said two sensing limits, follower means of magnetically permeable material, at least one of said actuator and follower means providing a magnetic field, support means for pivotally supporting said follower means on the exterior of said housing means and in magnetic flux path linkage with said actuator means to move in an arcuate path and follow the motion of said actuator means between said two actuator limits, an arm pivotally supported on said support means for rotation about an axis intermediate the ends of said arm and parallel to and spaced from the pivotal axis of said support means, indicator means including an indicator driven by a shaft rotationally journaled on said housing means and carrying a pinion gear drivingly engaged by a segmental gear rotationally supported by said housing means, a link member mechanically connecting said segmental gear and one end of said arm for angular drive of said segmental gear and indicator by angular movement of said support means and thereby provide indications by said indicator means of the prevailing height of fluid within said container, and means including a laterally extending lip on the other end of said arm and a screw-threaded member adjustably threaded through a flange on said support means and having a concentric groove engaging said lip for angularly adjusting said arm by incremental rotational amounts to correlate the indication range of said indicator means with the follow movement of said follower means between said two actuator limits.

11. A fluid level gauge for measuring the level of fluid within a container comprising: movable sensing means and non-magnetic housing means adapted to support said sensing means within a container for movement between two sensing limits to sense the level of fluid in the container, linearly reciprocable actuator means of magnetically permeable material coupled to said sensing means and guided within said housing means for movement between two actuator limits in proportion to the movement of said sensing means between said two sensing limits, follower means of magnetically permeable material, at least one of said actuator and follower means providing a magnetic field, support means for pivotally supporting said follower means on the exterior of said housing means and in magnetic flux path linkage with said actuator means to move in an arcuate path and follow the motion of said actuator means between said two actuator limits, variable potentiometer means supported on said housing means and including a resistive element and a contact element movable lengthwise of said resistive element, an arm pivotally supported on said support means for rotation about an axis parallel to and spaced from the pivotal axis of said support means, electrical indicator means electrically coupled to said potentiometer means for energization proportionally to the positioning of said contact element lengthwise of said resistive element, a link member mechanically connecting said contact element and said arm for angular drive of said contact element by angular movement of said support means and thereby provide indications by said indicator means of the prevailing height of fluid within said container, and means for angularly adjusting said arm by incremental rotational amounts to correlate the indication range of said indicator means with the follow movement of said follower means between said two actuator limits.

References Cited by the Examiner
UNITED STATES PATENTS

| | | | |
|---|---|---|---|
| 770,141 | 9/1904 | Wood et al. | 73—290.1 |
| 2,339,922 | 1/1944 | Gatewood | 73—290.1 |
| 2,425,691 | 8/1947 | Brewer | 73—290.1 |
| 2,554,374 | 5/1951 | Melas | 73—290.1 |
| 2,627,178 | 2/1953 | Hayward et al. | 73—313 X |
| 2,632,330 | 3/1953 | Marchment | 73—319 X |
| 2,671,834 | 3/1954 | Kmiecik | 73—290.1 |

OTHER REFERENCES

Publication: Industrial & Engineering Chemistry (I.E.C.), March 1947, page 263.

LOUIS R. PRINCE, *Primary Examiner.*

D. M. YASICH, *Assistant Examiner.*